UNITED STATES PATENT OFFICE.

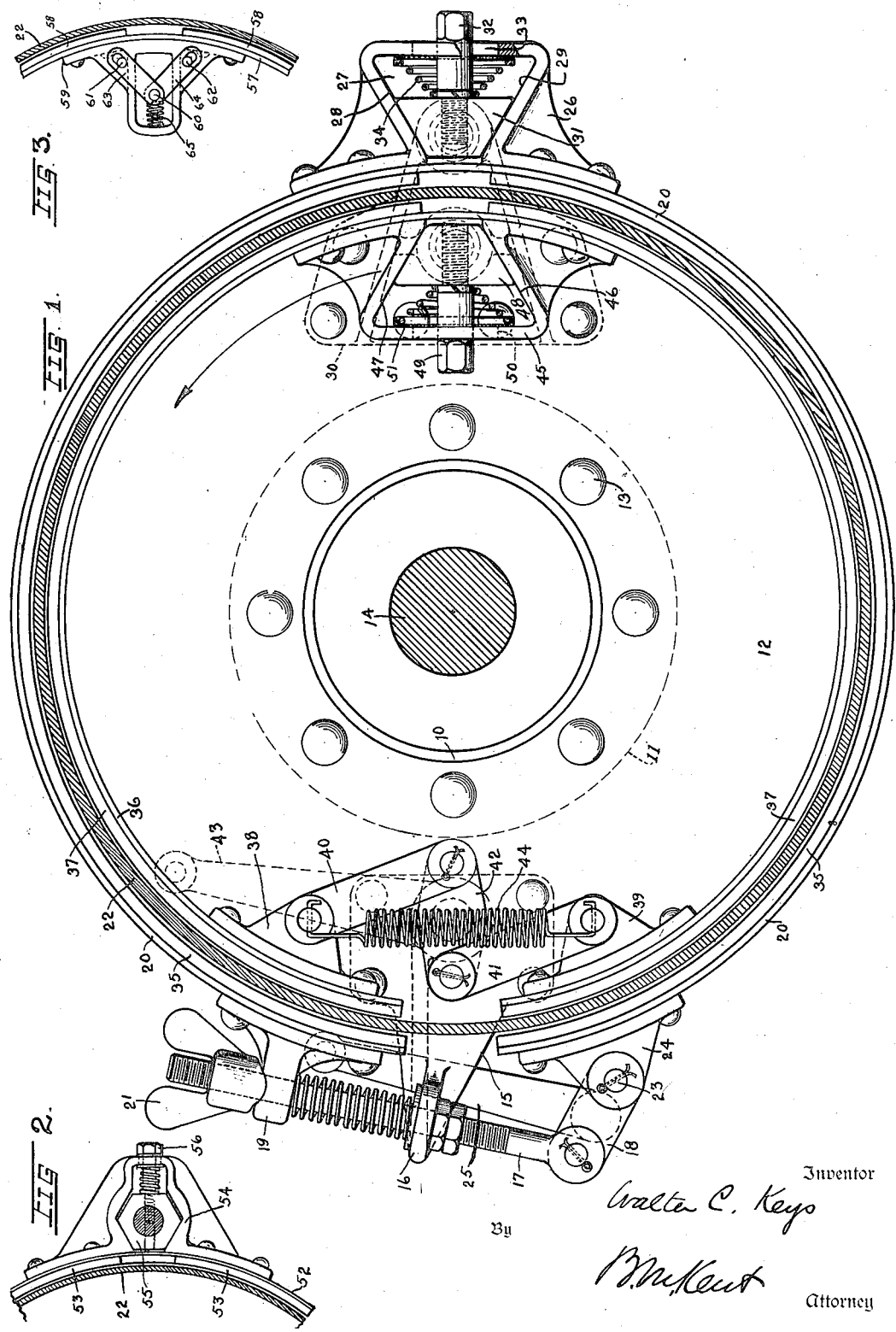

WALTER C. KEYS, OF CLEVELAND, OHIO, ASSIGNOR TO THE STANDARD PARTS COMPANY, OF CLEVELAND, OHIO, A CORPORATION OF OHIO.

BRAKE MECHANISM.

1,380,565.   Specification of Letters Patent.   Patented June 7, 1921.

Application filed September 6, 1918. Serial No. 252,812.

*To all whom it may concern:*

Be it known that I, WALTER C. KEYS, a citizen of the United States, and a resident of Cleveland, county of Cuyahoga, State of Ohio, have invented certain new and useful Improvements in Brake Mechanism, of which the following is a specification.

This invention relates to brake mechanism and more particularly to improvements in brake mechanisms for motor vehicles.

It is one of the objects of the present invention to provide a brake of the ordinary band type wherein the portions of the band, remote from the actuating device are automatically forced against the brake drum by circumferential movements of the brake band. Other objects and the features of novelty will be apparent from the following description taken in connection with the accompanying drawings, of which—

Figure 1 is a somewhat diagrammatical side elevation of an internal and external brake embodying my invention and shown in their relation to the brake drum.

Fig. 2 is a fragmentary view similar to Fig. 1 but showing a modification; and

Fig. 3 a view similar to Fig. 2 but showing still another modification.

Referring to Fig. 1 of the drawings, 10 indicates an axle housing having a flange 11 at the end thereof to which a plate or disk 12 is secured by means of the rivets 13. The usual drive shaft of the axle is indicated at 14.

Secured to the plate 12 is a bracket 15 which is provided with a perforated lug or laterally projecting abutment 16 through which the bolt 17 extends, this bolt being pivotally connected at one end with the actuating lever 18 and having its other end arranged in a bracket 19 which is secured to one end of the external brake band 20. A nut 21, on the bolt 17, coöperates with the bracket 19 so that when the bolt is drawn through the lug 16 the one end of the brake band 20 will be contracted against the brake drum 22. The brake drum is here shown in section and the usual cylindrical brake drum is represented.

The lever 18 is pivotally connected at 23 with a bracket 24 on the other end of the brake band 20, and is provided with an arm 25 to which any suitable lever mechanism may be connected. The actuating mechanism for the external brake 20 may be of any preferred form and that illustrated is more or less of the conventional type now in common use on motor vehicles.

Opposite the actuating mechanism just described the brake band 20 has secured thereto a bracket 26 which is formed with a wedge-shaped opening 27, the opposing faces 28 and 29, of which, are oppositely inclined relatively to the adjacent portion of the brake drum 22. A bracket 30 is secured to the plate 12 and carries an arm or abutment 31 which projects into the opening 27 and is provided with faces parallel with the surfaces 28 and 29 and coöperating with the latter in the manner hereinafter described. A stud 32 is secured in the abutment 31 and projects through the elongated opening 33 in the bracket 26 and thereby holds the brake 20 against lateral movement, although permitting limited movements of the brake band circumferentially, in either direction. A spring 34 surrounds the stud 32 and bears against the abutment 31 and the interior of the bracket 26 and serves the purpose of retracting the brake band after the latter has been released.

The brake band 20 is provided with the usual lining 35 which may be in a plurality of sections as shown or in one piece.

In the operation of the brake, when the ends are contracted against the drum 23 by means of the lever 25, as is well understood by those skilled in this art, the brake band tends to travel with the drum 20 and if the drum is rotating in the direction of the arrow the brake band will be carried in the same direction and the surface 29 of the bracket 26 will, through its wedging action on the abutment 31, throw the adjacent portion of the brake band 20 against the brake drum and thereby augment the braking force. When the rotation is backward, or in the opposite direction to the arrow, the coöperation of the surface 28 with the abutment 31 will effect a similar movement of the brake against the drum.

Referring now to the illustration of the invention as applied to an internal brake, the brake band is indicated at 36 and is provided with the usual lining 37, which may be in sections or in one piece as preferred. At the ends of the band 36 are the brackets 38 and 39 to which the links 40 and 41, respectively, are connected. Links 40 and 41 are also connected with a lever 42 which is actuated by the arm 43 in the usual manner. The usual spring 44 is provided between the ends of the band for the purpose of retracting the same.

The bracket 45 is secured to the brake band 36 and is generally similar to the bracket 26 and provided with the internal surfaces 46 and 47 which coöperate with corresponding surfaces on the abutment 48 which is a part of the brake anchorage, as is also the abutment 31, previously described. The stud 49 is secured in the abutment 48 and extends through an elongated opening 50 in the bracket 45, such opening being similar to the opening 33 and this arrangement holding the brake band against lateral movement while permitting circumferential movements in either direction. The retracting spring 51 is arranged on the interior of the bracket 45 and bears against the abutment 48.

In the operation of the internal brake just described the expansion of the ends of the band against the interior of the drum 22 causes the brake band to be moved circumferentially with the drum and the coöperation of the surfaces 46 and 47 with the coöperating surfaces on the abutment 48 effect a movement of the brake band outwardly against the drum and thus the braking force is augmented.

Referring to Fig. 2 it will be noted that I have illustrated the brake drum 22 and the external brake band 52 which is provided with lining 53. A bracket 54 is secured on the band 52 and is provided with an opening for the abutment 55 which is of hexagonal cross section, a standard commercial bar, and to which the stud 56 is secured, this stud serving the same purpose as the studs 32 and 49 previously described. From the previous description it will be evident from Fig. 2 that this modified construction will function in exactly the same manner as the external brake shown in Fig. 1 and that the construction is applicable to the internal brake in the same way that the construction shown in Fig. 1 applies to both the internal and external brakes.

Referring to Fig. 3 it will be seen that I have illustrated an internal brake 57 which has the lining 58 and coöperates with the drum 22. The hollow bracket 59 is secured on the brake 57 and extending into the opening in the bracket 59 is the pivot 60 which is carried by the brake anchorage. The bracket 59 is provided with pivots 61 and 62 on opposite sides of the opening therein and links 63 and 64, respectively, connect these pivots with the pin 60. The retracting spring 65 is arranged between the pin 60 and the inner end of the bracket 59. The openings in the links 63 and 64 for the pivots 61 and 62 are elongated as shown to permit the links 63 and 64 to act as toggles for forcing the brake against the drum 22 for either direction or rotation of the latter.

While I have illustrated and described preferred forms of my invention, it will be understood that the invention is applicable to other constructions and I, therefore, claim and intend to cover all such constructions as come within the scope of the appended claims.

Having thus described my invention, what I claim is;

1. In brake mechanism, the combination of a revoluble member having a cylindrical brake surface, a brake anchorage, a circular brake coöperating with said surface, means for moving one or more of the ends of said brake to apply and release same, means secured to said brake intermediate the ends of the latter and having opposed surfaces spaced apart to coöperate with said anchorage, said anchorage having a part projecting between said opposed surfaces and coöperating therewith to force the brake against said member irrespective of its direction of rotation, and spring means between said part and the last-mentioned means adapted to retract the brake.

2. In brake mechanism, the combination of a revoluble member having a cylindrical brake surface, a brake anchorage, a circular brake coöperating with said surface, means for moving one or more of the ends of said brake to apply and release same, means secured to said brake intermediate the ends of the latter and having opposed surfaces spaced apart to coöperate with said anchorage, and said anchorage having a part of polygonal cross-section projecting between said opposed surfaces and with two of its relatively inclined sides parallel with said opposed surfaces, respectively, and coöperating therewith to force the brake against said member irrespective of its direction of rotation, a stud secured to said member and holding the brake against lateral movement, and a spring surrounding said stud and arranged to retract said brake from said member.

3. In brake mechanism, the combination of a revoluble member, a brake anchorage, a brake coöperating with said member, means adjacent the ends of the brake for actuating the same, a bracket secured to said brake intermediate its ends coöperating with said anchorage to hold the brake and force the adjacent part thereof against said member upon actuation of the brake, and spring means coöperating with said bracket and said anchorage to retract said brake upon the release thereof.

4. In brake mechanism, the combination of a revoluble member, a brake anchorage, a brake coöperating with said member, means adjacent the ends of the brake for actuating the same, and a bracket secured to said brake intermediate its ends, said bracket and said anchorage having coöperating parts so inclined relatively to the adjacent part of said member that movements of the brake in the direction of revolution of the member when applied thereto are accompanied by corresponding movements of the brake against said member and having interengaging means for holding the brake against movement axially of the revoluble member.

In testimony whereof I affix my signature.

WALTER C. KEYS.